(12) United States Patent
Grgic et al.

(10) Patent No.: US 7,870,223 B2
(45) Date of Patent: Jan. 11, 2011

(54) SERVICES ASSOCIATED WITH AN INDUSTRIAL ENVIRONMENT EMPLOYING CONTROLLER ENGINE INSTANCES

(75) Inventors: Richard J. Grgic, Painsville, OH (US); Subbian Govindaraj, Solon, OH (US); Kenwood H. Hall, Hudson, OH (US); Robert J. Kretschmann, Bay Village, OH (US); Charles M. Rischar, Chardon, OH (US); Raymond J. Staron, Chagrin Falls, OH (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 589 days.

(21) Appl. No.: 11/738,784

(22) Filed: Apr. 23, 2007

(65) Prior Publication Data
US 2008/0208369 A1    Aug. 28, 2008

Related U.S. Application Data

(63) Continuation-in-part of application No. 11/679,380, filed on Feb. 27, 2007, and a continuation-in-part of application No. 11/679,394, filed on Feb. 27, 2007.

(51) Int. Cl.
G06F 15/16 (2006.01)
(52) U.S. Cl. ............... 709/217; 709/219; 709/226; 709/201
(58) Field of Classification Search .......... None
See application file for complete search history.

(56) References Cited

U.S. PATENT DOCUMENTS

| | | | |
|---|---|---|---|
| 5,142,469 A | | 8/1992 | Weisenborn |
| 5,796,603 A | * | 8/1998 | Hodorowski ............ 700/2 |
| 5,826,244 A | * | 10/1998 | Huberman ............ 705/37 |
| 5,875,461 A | | 2/1999 | Lindholm |
| 5,887,029 A | | 3/1999 | Husted et al. |
| 5,949,674 A | | 9/1999 | Song et al. |
| 5,970,243 A | * | 10/1999 | Klein et al. ............ 700/83 |
| 5,971,581 A | | 10/1999 | Gretta et al. |
| 6,055,370 A | | 4/2000 | Brown et al. |
| 6,268,853 B1 | | 7/2001 | Hoskings et al. |
| 6,338,130 B1 | | 1/2002 | Sinibaldi |

(Continued)

OTHER PUBLICATIONS

OA dated Apr. 1, 2009 for U.S. Appl. No. 11/738,787, 32 pages.

(Continued)

*Primary Examiner*—Thu Nguyen
*Assistant Examiner*—Nam Tran
(74) *Attorney, Agent, or Firm*—Turocy & Watson LLP; R. Scott Speroff; John M. Miller

(57) ABSTRACT

The claimed subject matter provides a system and/or method that facilitates providing a service to an industrial environment. A selection component can identify a portion of data hosted by a remote server. A build component can construct at least one of a portion of a customized application or a portion of a customized service based at least in part upon the portion of data, wherein at least one of the portion of customized application or the portion of customized service is utilized within the industrial environment.

24 Claims, 12 Drawing Sheets

U.S. PATENT DOCUMENTS

| | | | |
|---|---|---|---|
| 6,373,836 | B1 | 4/2002 | Deryugin et al. |
| 6,453,460 | B1 | 9/2002 | Keyes |
| 6,615,092 | B2 | 9/2003 | Bickley et al. |
| 6,735,764 | B2 | 5/2004 | Nakai |
| 6,816,746 | B2 | 11/2004 | Bickley et al. |
| 6,882,890 | B2 | 4/2005 | Horn et al. |
| 6,901,446 | B2 | 5/2005 | Chellis et al. |
| 6,922,681 | B2 | 7/2005 | Fromherz et al. |
| 6,947,798 | B2 * | 9/2005 | Bronikowski et al. ......... 700/90 |
| 7,039,740 | B2 | 5/2006 | Glasco et al. |
| 7,065,714 | B1 | 6/2006 | Theel et al. |
| 7,139,618 | B2 | 11/2006 | Danz et al. |
| 7,257,620 | B2 | 8/2007 | Lo |
| 7,272,815 | B1 * | 9/2007 | Eldridge et al. ............. 709/225 |
| 7,374,524 | B2 | 5/2008 | McCormick |
| 7,472,387 | B2 | 12/2008 | Nakano |
| 2002/0129085 | A1 | 9/2002 | Kubala et al. |
| 2002/0194417 | A1 | 12/2002 | Suzuki et al. |
| 2003/0163508 | A1 | 8/2003 | Goodman |
| 2004/0117535 | A1 | 6/2004 | Schaftlein |
| 2004/0260408 | A1 | 12/2004 | Scott et al. |
| 2005/0024102 | A1 | 2/2005 | Kondo |
| 2005/0028137 | A1 | 2/2005 | Evans et al. |
| 2005/0202808 | A1 | 9/2005 | Fishman et al. |
| 2006/0005171 | A1 | 1/2006 | Ellison |
| 2006/0041328 | A1 * | 2/2006 | McCormick ................ 700/179 |
| 2006/0092861 | A1 * | 5/2006 | Corday et al. ................ 370/256 |
| 2006/0150174 | A1 | 7/2006 | Abe et al. |
| 2006/0178757 | A1 | 8/2006 | Grgic et al. |
| 2006/0200257 | A1 | 9/2006 | Kirste et al. |
| 2007/0044066 | A1 | 2/2007 | Meijer et al. |
| 2007/0173959 | A1 | 7/2007 | Chandhoke |
| 2008/0066019 | A1 * | 3/2008 | Worek et al. ................ 715/965 |
| 2008/0090586 | A1 | 4/2008 | Engelhart |
| 2008/0109471 | A1 | 5/2008 | Subbian et al. |
| 2008/0125877 | A1 | 5/2008 | Miller et al. |

OTHER PUBLICATIONS

OA dated Mar. 20, 2009 for U.S. Appl. No. 11733390, 35 pages.
OA mailed Feb. 25, 2009 for U.S. Appl. No. 11/686,406, 29 pages.
OA mailed Mar. 20, 2009 for U.S. Appl. No. 11/679,394, 37 pages.
OA mailed Mar. 9, 2009 for U.S. Appl. No. 11/695,758, 33 pages.
OA mailed Mar. 19, 2009 for U.S. Appl. No. 11/733,357, 34 pages.
OA mailed Mar. 20, 2009 for U.S. Appl. No. 11/679,380, 41 pages.
OA dated Oct. 7, 2009 for U.S. Appl. No. 11/679,380, 38 pages.
OA dated Aug. 20, 2009 for U.S. Appl. No. 11/686,406, 31 pages.
OA dated Oct. 19, 2009 for U.S. Appl. No. 11/695,758, 32 pages.
OA dated Oct. 2, 2009 for U.S. Appl. No. 11/738,787, 22 pages.
OA dated Oct. 19, 2009 for U.S. Appl. No. 11/733,357, 38 pages.
OA dated Oct. 16, 2009 for U.S. Appl. No. 11/733,390, 41 pages.
Foley. "Modify MicroLogix Online." Feb. 2006, A-B Journal, vol. 13, No. 1, abstract, pp. 1-2.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug. 15, 2006; QNX Software Systems, pp. 1-9.
OA dated Feb. 22, 2010 for U.S. Appl. No. 11/738,787, 35 pages.
OA dated Apr. 14, 2010 for U.S. Appl. No. 11/733,390, 67 pages.
Office Action dated May 24, 2010 for U.S. Appl. No. 11/695,727, 37 pages.
Office Action dated Jun. 24, 2010 for U.S. Appl. No. 11/745,023, 51 pages.
Office Action dated Jun. 3, 2010 for U.S. Appl. No. 11/695,758, 54 pages.
Hardin, Davis S; "Crafting a JAVA Virtual Machin in Silicon"; Mar. 2001; IEEE Xplore; IEEE Instrumatation & Measurement Magazine; pp. 54-56.
Hassapis, George; "Sift-testing of industrial control systems programmed in IEC 1131-3 languages"; 2000; ISA Transactions vol. 39 pp. 345-355.
OA dated Mar. 20, 2009 for U.S. Appl. No. 11/733,390, 35 pages.

* cited by examiner

SERVICES ASSOCIATED WITH AN INDUSTRIAL ENVIRONMENT EMPLOYING CONTROLLER ENGINE INSTANCES

CROSS REFERENCE TO RELATED APPLICATION(S)

This continuation-in-part application claims the benefit of U.S. patent application Ser. No. 11/679,380 filed on Feb. 27, 2007, entitled "CONSTRUCTION OF AN INDUSTRIAL CONTROL SYSTEM USING MULTIPLE INSTANCES OF INDUSTRIAL CONTROL ENGINES" and U.S. patent application Ser. No. 11/679,394 filed on Feb. 27, 2007, entitled "DYNAMIC LOAD BALANCING USING VIRTUAL CONTROLLER INSTANCES." The entireties of such applications are incorporated herein by reference.

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine and a one-to-one ratio between controllers and control engines must be maintained. Moreover, applications, services, processes, and the like related to such conventional controllers (e.g., including the environments themselves) are typically extremely difficult to implement within an environment without personalization and/or customization. With numerous amounts of devices, applications, processes, hardware, software, etc., programming with such customization within an environment can be an overwhelming task consuming massive amounts of resources and time.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate deploying a portion of an application or a portion of a service in a customized manner within an industrial environment. A selection component can identify a portion of data hosted by a remote server to enable a build component to construct at least one of a customized application or a customized service for an industrial environment utilizing the portion of data. In particular, the remote server can host a myriad of applications, services, data, etc., wherein the applications, data, services, etc. can be customized for a particular industrial environment. Moreover, the remote server can be a palette of data for which portions of such can be identified and utilized to construct industrial-specific applications and/or services.

In accordance with an aspect of the subject innovation, a locate component can facilitate identifying portions of data not hosted by the remote server. The locate component can locate and/or find such portion of data not hosted by the remote server by exposing such data request to enable bidding and/or acceptance of the data request. For instance, the locate component can post the data request to various forums, wherein interested parties can bid for the data request contract. In other aspects of the claimed subject matter, methods are provided that facilitate creating customized applications and/or services to be implemented within an industrial environment.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
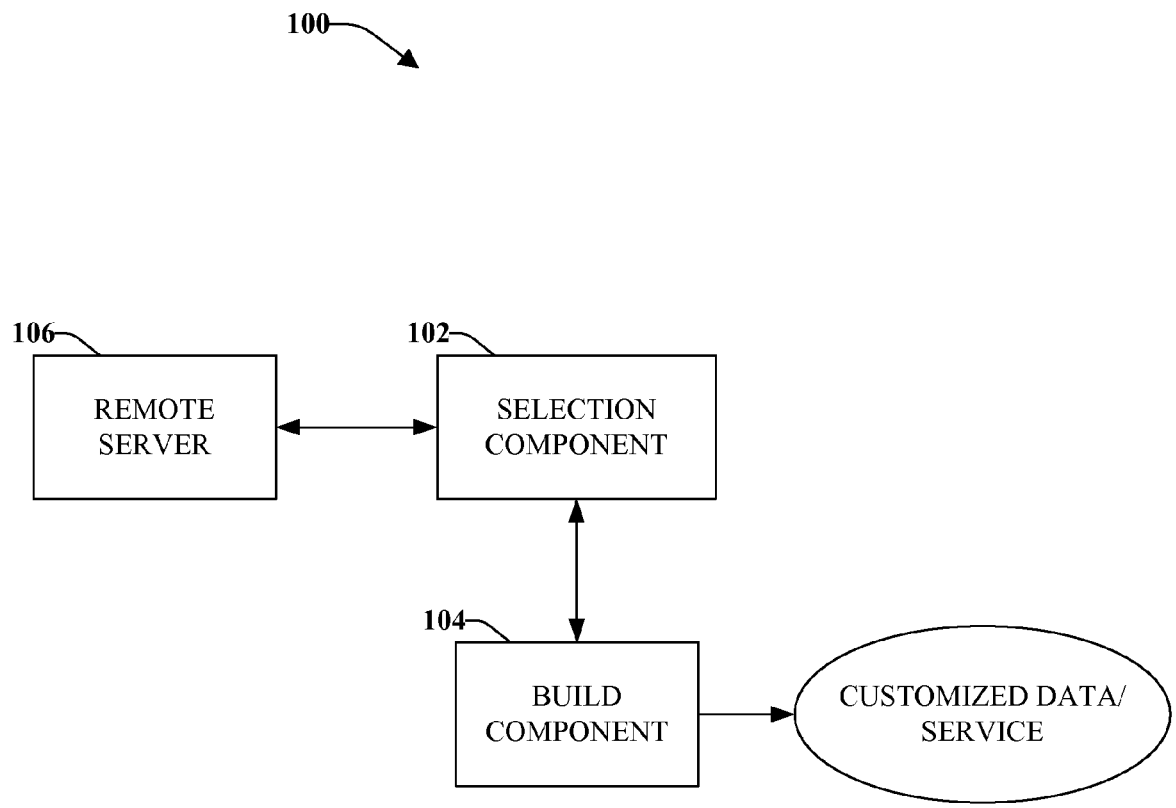
FIG. 1 illustrates a block diagram of an exemplary system that facilitates deploying a portion of an application or a portion of a service in a customized manner within an industrial environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," "server," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates deploying a portion of an application or a portion of a service in a customized manner within an industrial environment. The system 100 can include a selection component 102 that can identify a portion of data (e.g., a portion of an application, a portion of service, a portion of software, a portion of code, a portion of a process, etc.) hosted by a remote server 106, wherein a build component 104 can construct and/or assemble the portion of data (e.g., alone, in combination with disparate portions of data from the remote server 106, and/or in combination with disparate data) to create a portion of customized data and/or a portion of customized service. The portions of data constructed and/or assembled can be employed and/or utilized within an industrial environment to provide customization, personalization, and/or industrial-specific tailoring. In particular, the selection component 102 can identify various portions of data that can be utilized within an industrial environment from the remote server 106. The remote server 106 can be a host to a myriad of data, applications, software, processes, functional blocks, services, upgrades, tools, etc. (discussed in more detail infra) that can be constructed and/or assembled to be deployed and/or utilized within an industrial environment. In other words, the remote server 106 can be a remote palette of applications, data, tools, services, functional blocks, processes, software, etc. to which the selection component 102 can identify and/or select to implement within an industrial environment upon construction and/or assembly by the build component 104.

The selection component 102 can identify and/or select a portion of data from the remote server 106 based at least in part upon most any suitable data request. It is to be appreciated that the data request can be received from a user, a machine, a component, a client, a group, a facility, an enterprise, a business, a collection of machines, a collection of users, a programmer, an industrial environment, a network, a disparate server, a website, an email application, an application, a mobile device (e.g., a laptop, a portable digital assistant (PDA), a tablet PC, a handheld, etc.), a mobile communication device (e.g., a smart phone, a cellular phone, etc.), and/or most any suitable entity, user, or machine that can select portions of data remotely. For example, a managing programming engineer can select a collection of functional blocks hosted by a remote server to which some functional blocks can be assembled and/or constructed together to create a customized application and/or a customized service for implementation within an industrial environment. Moreover, the remote server 106 can be most any suitable remote server that can host a portion of data that can be selected and/or utilized within an industrial environment. It is to be appreciated that the remote server 106 can be most any suitable server that is remote in comparison to the industrial environment. For instance, the remote server 106 can be a user, an entity (e.g., a group, a facility, an enterprise, a business, a factory, a collection of machines, a collection of computers, a collection of users, a programmer, most any combination thereof, etc.), a machine, a computer, a disparate industrial environment, a third-party, a second-party, a vendor, the Internet, a network, a service, a disparate network not affiliated with the industrial environment, and/or most any suitable component or user that can provide a portion of data that can be utilized within the industrial environment.

By allowing portions of data to be selected from a palette of data hosted by a remote server, customized applications and/or services can be more easily provided since such customized services and/or applications are collaborated portions of data rather than creating such services and/or applications from scratch (e.g., programming each line of code for an application or service rather than selecting pre-written lines of code from a remote server). For instance, a user desiring a customized application for an industrial environment can select portions of data (e.g., functional blocks, operation-based code, control blocks, etc.) where a first portion can relate to receiving data, a second portion can relate to interpreting such data, and a third portion can relate to printing such data. Upon selection of such portions of data, the first, second, and third portions of data can be assembled and/or constructed to be utilized as an application within the particular industrial environment rather than writing and/or creating such application line-by-line.

The system 100 can provide third-party services/applications to a client for implementation in an industrial environment, wherein such services/applications can be specifically tailored for a particular industrial environment. For example, the services/applications can relate to partitioned applications (e.g., functional blocks and/or control blocks to combine and execute a process, portions of data based on operation, portions of data related to applications, portions of data related to code and/or programming languages, etc.), connectivity within an industrial environment, testing (e.g., emulation of a controller and/or controller engine instance, application and/or process simulation, etc.), pre-tests for a controller and/or a controller engine instance, customized controllers and/or engines, diagnostics for an industrial environment, safety/security related to an industrial environment, dynamic updates related to an industrial environment, load balancing, monitoring, data back-up, business analysis, most any suitable service and/or application that can be provided to an industrial environment, etc. In particular, the remote server 106 can host a myriad of services/data/applications, wherein a client can identify portions of such services/data/applications to employ (e.g., construct, assemble, deploy, etc.) in an industrial environment. Thus, a client can remotely access the remote server 106, customize an application and/or service for an industrial environment (e.g., build, assemble, construct, etc.), and deploy such application and service, wherein the third-party can maintain, implement, and/or upgrade such customized services and/or applications. For example, a particular customized application and/or service can be employed from the remote server 106, wherein the industrial environment can allow the remote server 106 to maintain a portion of ownership and/or control for maintenance related to such service and/or application.

Figure 2:
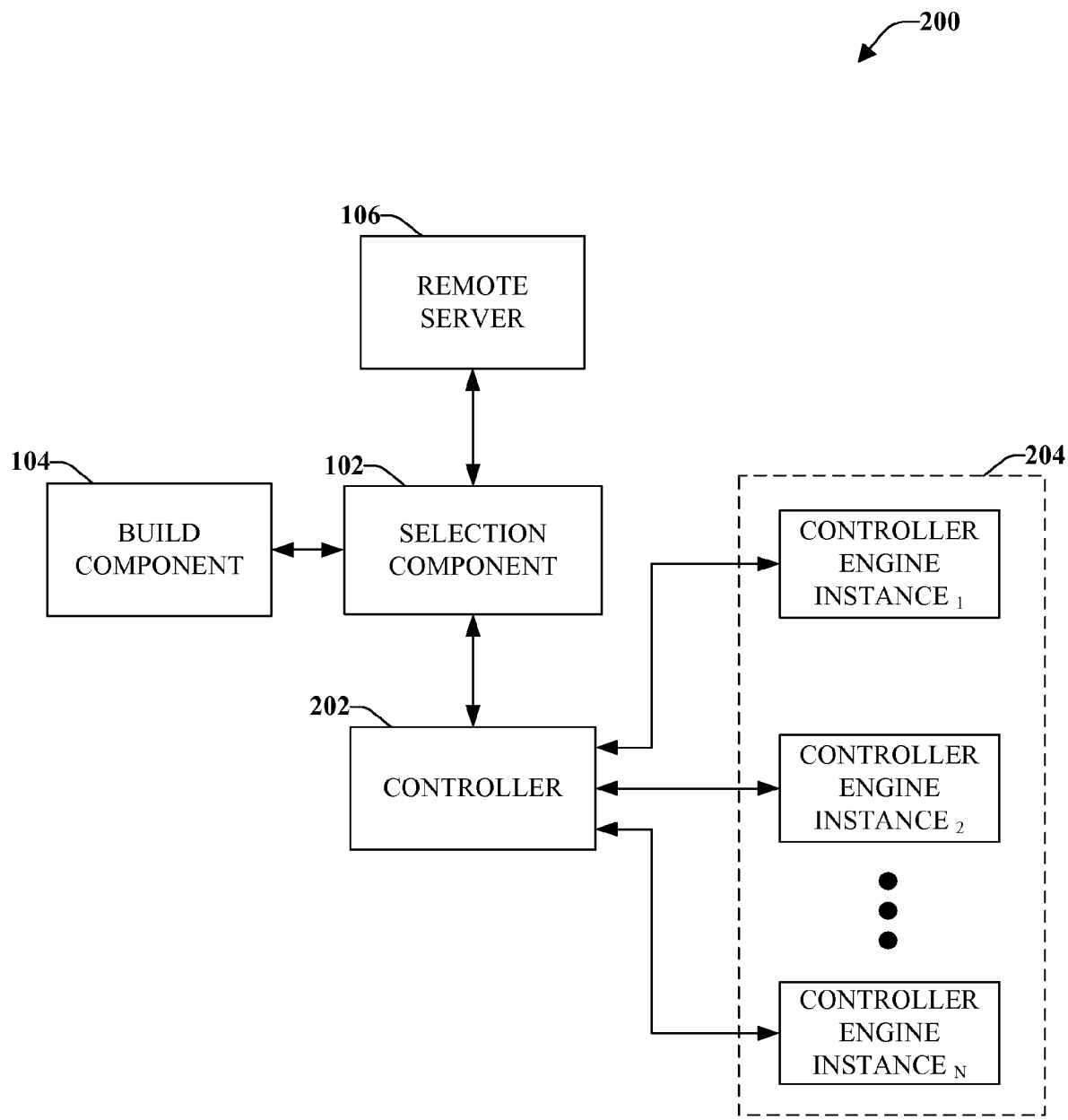
FIG. 2 illustrates a block diagram of an exemplary system that facilitates employing one or more controller engine instances related to a controller and utilizing customized data therewith.

FIG. 2 illustrates a system 200 that facilitates employing one or more controller engine instances related to a controller and utilizing customized data therewith. The system 200 can include a controller 202 that can generate at least one controller engine instance 204, wherein the controller engine instance 204 can execute on the controller 202 with a real time operating system (OS) to be utilized with automating/controlling an industrial manufacturing device and/or process. It is to be appreciated most any suitable operating system can be utilized by the subject innovation (e.g., a proprietary operating system, off-the-shelf, a third-party operating system, an open source operating system, a real time operating system (OS), etc.). The controller 202 can utilize most any suitable number of controller engine instances 204 such as controller engine instance$_1$ to controller engine instance$_N$, where N is a positive integer. In other words, the controller 202 can implement a plurality of controller engine instances 204, wherein each controller engine instance can handle controlling a device and/or portion of a process within an industrial automation environment. It is to be appreciated that the system 200 can enable the creation of a new instance of an engine based on a set of pre-defined parameters. In other words, no user intervention is needed to start a new instance of the engine.

It is to be appreciated that the controller 202 can contain software components and hardware components having inputs and/or outputs that can be utilized in connection with automating an industrial manufacturing device/process. Moreover, it is to be appreciated and understood that the controller 202 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc. It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder).

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instances can be managed to control, handle, and/or execute a device and/or process in most any suitable combination.

In another example, an industrial automation environment can include controller A, controller B, and controller C. In one scenario, controller engine instances can execute on a corresponding parent/host controller. However, there can be distributed controller engine instances (e.g., a controller engine instance with more than one host and/or parent controller) such that more than one controller can handle and/or host a controller engine instance. Thus, controller A and controller B can share the hosting duties for a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

In addition, the selection component 102 can utilize the remote server 106 to provide various services and/or portions of data that relate to utilizing multiple controller engine instances, which can enable at least one of isolation (e.g., based on language, scale data, versioning data, geography, application relation, proximity of devices, hardware, etc.) of an industrial environment, prioritization of an industrial environment, scalability within an industrial environment, on-line editing, versioning updates, security within an industrial environment, load balancing for an industrial environment, redundancy utilizing multiple controller engine instances within an industrial environment, safety related to an industrial environment, and the like. In one example, a client can select services and/or applications associated with implementing multiple controller engine instances within an industrial environment via the system 200, wherein such services and/or applications can be built and deployed to provide a specifically tailored service and/or application associated with multiple controller engine instances for the industrial environment. Furthermore, the selection component 102 can identify portions of data from the remote server 106 to enable the build component 104 to construct and/or assemble such portions of data for employment with at least one of the industrial environment, the controller 202, the controller engine instances 202, and/or most any suitable combination.

Figure 3:
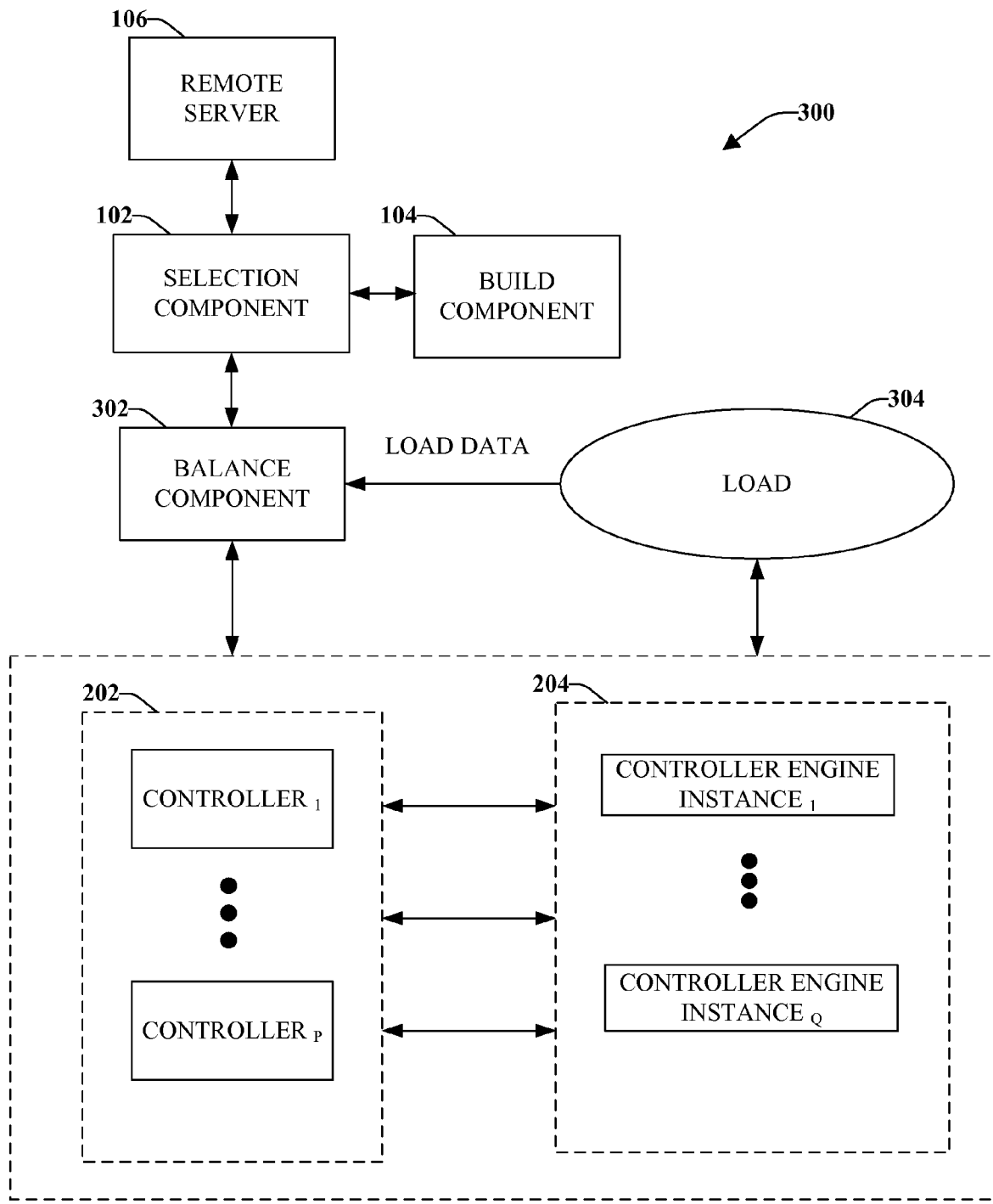
FIG. 3 illustrates a block diagram of an exemplary system that facilitates dynamically distributing a load amongst a plurality of controllers and/or a plurality of controller engine instances and utilizing personalized data therewith.

FIG. 3 illustrates a system 300 that facilitates dynamically distributing a load amongst a plurality of controllers and/or a plurality of controller engine instances and utilizing personalized data therewith. The system 300 can include a balance component 302 that can employ dynamic allocation of a portion of a load 304 to one or more controllers 202 and/or one or more controller engine instances 204 without user intervention. Generally, the balance component 302 can adjust a load assignment (e.g., load A is assigned to controller X, load B is assigned to controller Y, etc.) for controllers 202 (and respective controller engine instances 204) within an industrial automation environment without user intervention. Moreover, the balance component 302 can allow the distribution of most any suitable portion of the load 304 to most any suitable portion of the controllers 202 or most any suitable portion of controller engine instances 204. The examples and illustrations below associated with dynamic load distribution is intended to include distribution to a controller as well as distribution to a controller engine instance and the claimed subject matter is to include most any suitable combination of employing a controller and/or a controller engine instance.

For example, the load 304 can be partitioned into five (5) parts with five (5) controllers handling/controlling each part. In another example, the load 304 can be divided into four (4) pieces where a controller A can handle/control 2 pieces, controller B can handle/control 1 piece, and controller C can handle/control 1 piece. Still further, the load 304 can be divided into three (3) pieces where a host controller can include most any suitable number of controller engine instances that can handle/control the three (3) pieces accordingly (e.g., evenly distributed, percentage-based, processor-based percentage, resource availability-based, etc.). It is to be appreciated that the load 304 can be partitioned and/or distributed based on most any suitable manner such as, but not limited to, controller resources, controller engine instance resources, processor availability, processing capabilities, percentage based, functionality, importance, priority, security, location, source/origin, user preference, user-defined manner, relation to source code, etc. Furthermore, it is to be appreciated that the balance component 302 can distribute a portion of the load 304 to most any suitable number of controllers 202 such as controller$_1$ to controller$_P$, where P is a positive integer. Moreover, it is to be appreciated that the balance component 302 can distribute a portion of the load 304 to most any suitable number of controller engine instances 204 such as controller engine instance$_1$ to controller engine instance$_Q$, where Q is a positive integer regardless of the host controller (e.g., remote, local, resources, processing capabilities, etc.). Although a single balance component 302 is depicted, it is to be appreciated and understood that most any suitable number of balance components can be employed such that the balance component can be within each controller, a stand-alone component, and/or most any suitable combination thereof.

By evaluating at least one of the load 304 and/or the controllers 202, the balance component 302 can enable self-tuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 304, the system 300 greatly improves traditional techniques and/or mechanisms associated with controllers. It is to be appreciated that the load 304 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc. For instance, the balance component 302 can monitor and/or track most any suitable characteristic associated with the capability of the controllers 202 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, controller embedded software (e.g., firmware), etc.

Furthermore, it is to be appreciated that communication between most any suitable controllers (and/or controller engine instances 204) handling/controlling a portion of the load 304 can be employed. Thus, the controllers 202 and/or controller engine instances 204 can communicate to each other in relation to the distribution of the load 304 therewith. Moreover, it is to be understood that the communication can be among most any suitable controller and/or controller engine instance associated with the system 300 and the communication need not be between controllers sharing the load 304. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 302 can receive such communications and re-distribute the allocation of the load 304 accordingly in real-time.

Moreover, the system 300 can include the selection component 102 that can identify a portion of data (e.g., a portion of an application, a portion of a service, a portion of a process, etc.) hosted by the remote server 106 that can be constructed, assembled, and/or employed by the build component 104 to the industrial environment. In particular, the portions of data that can be deployed to the industrial environment can be related to at least one of the balance component 302, the load 304, the controller 202, the controller engine instances 204, and/or most any suitable combination thereof. In general, various services and/or applications can be customized and/or specifically tailored to a particular environment in order to optimize performance thereof. For example, a service can be employed to monitor and/or evaluate the system 300 to ensure load balancing is configured in an optimal manner. In another example, the balance component 302 can be maintained and/or managed by a third-party service associated with the remote server 106.

Figure 4:
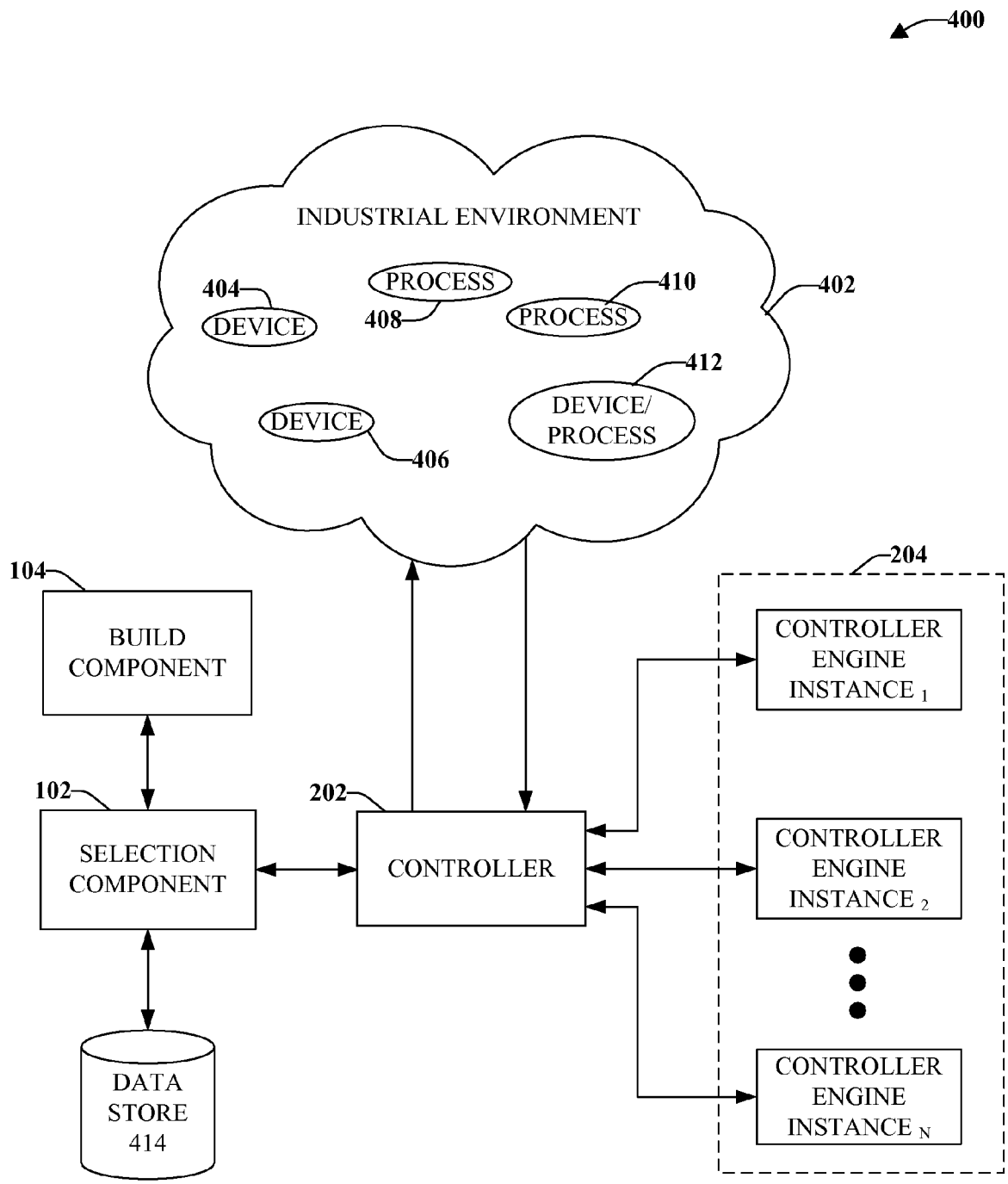
FIG. 4 illustrates a block diagram of an exemplary system that facilitates creating customized applications and/or services to be implemented within an industrial environment.

FIG. 4 illustrates a system 400 that facilitates creating customized applications and/or services to be implemented within an industrial environment. The selection component 102 can identify a portion of data (e.g., a portion of a service, a portion of an application, a portion of a process, etc.) hosted and/or related to a remote server (not shown but described in previous figures) to enable the build component 104 to construct, assemble, and/or employ the portion of data within an industrial environment 402. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. Moreover, it is to be appreciated that the devices and/or processes within the network can communicate utilizing most any suitable technique (e.g., employing CIP but transmission of data can be accomplished using a technique not defined as a network). The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, a robot, etc. Furthermore, the device and/or process can be controlled by the controller 202, at least one controller engine instance 204, a portion of a controller engine instance, and/or most any suitable combination thereof. It is to be appreciated that a controller can be executed as a component of a larger system can take part of the load sharing. For example, the controller can be executing as a component of the welder, wherein the controller may be capable of also interacting with the selection component 102.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers (discussed in more detail in FIG. 10). It is understood that this is but one example of a hierarchy, and is for illustrative purposes only. Moreover, the proprietary standard can include customer defined hierarchies as well as industrial automation company defined hierarchies (e.g., a company can provide tools to which customers can provide their own hierarchies).

Moreover, the system 400 can include a data store 414 that can store most any suitable data related to the selection component 102, the controller 202, a controller engine instance 204, and/or most any suitable combination thereof. For example, the data store 414 can store portions of data related to the remote server, settings associated with a portion of a service, settings associated with a portion of an application, build data utilized to assemble data from the remote server and/or third-party, user profiles, passwords, preferences related to desired data, details associated with an industrial environment, target source for the portion of data received from the remote server, etc. The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), MRAM, a combination of NV memory with the access speeds of volatile memory, and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Figure 5:
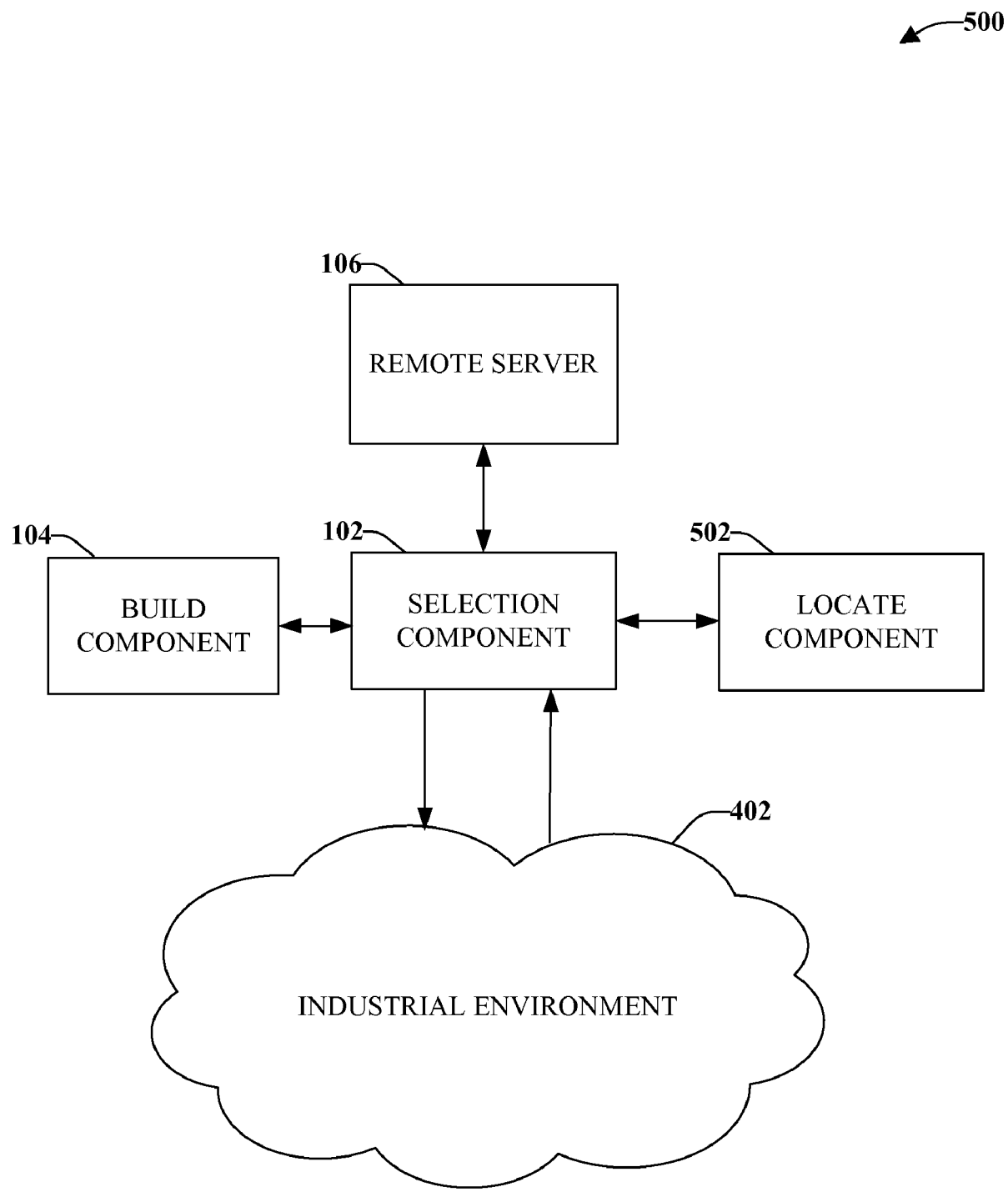
FIG. 5 illustrates a block diagram of an exemplary system that facilitates identifying a resource that can generate a portion of customized data for deployment within an industrial environment.

FIG. 5 illustrates a system 500 that facilitates identifying a resource that can generate a portion of customized data for deployment within an industrial environment. The system 500 can include the selection component 102 that can identify a portion of an application and/or a portion of a service hosted by the remote server 106 to be built with customization and/or industrial-specific tailoring by the build component 104. Upon construction and/or assembly, the customized portion of data (e.g., service, application, data, process, etc.) can be utilized by the industrial environment 402 and respective entities (e.g., controllers, controller engine instances, applications, processes, devices, etc.). It is to be appreciated that the system 500 can enable the creation of industrial-specific applications and/or services based upon utilizing a third-party service (e.g., a remote server) independent of the industrial environment 402.

The system 500 can further include a locate component 502 that can facilitate identifying a portion of data and/or service that is not hosted by the remote server 106. In other words, if the selection component 102 attempts to identify a portion of data that is not hosted and/or located on the remote server 106, the locate component 502 can locate and/or find such portion of data and/or an entity that can provide such portion of data. For example, the selection component 102 can identify a particular request as not being hosted by the remote server 106, wherein the locate component 502 can attempt to locate such particular request. For instance, the locate component 502 can post such request to enable various entities to respond whether completion of such task can be made. It is to be appreciated that the locate component 502 can post such request to a website, the Internet, a blog message board, users via communications (e.g., email, text message, voice over Internet Protocol (VOIP), etc.), companies, a forum capable of locating third-parties that can complete the requested task, a network dedicated to entities that can perform data requests related to industrial environments, programmers, groups of companies, enterprises, managers, most any suitable third-party that can fulfill such request, etc. In one particular example, the locate component 502 can identify a plurality of entities that can fulfill a request and can initiate an auction to bid out the contract to fulfill such request enabling the industrial environment 402 to receive the fulfillment of the request at a spot market price. In addition, upon fulfillment of the data request by the locate component 502, the remote server 106 can be updated with such data fulfillment.

Figure 6:
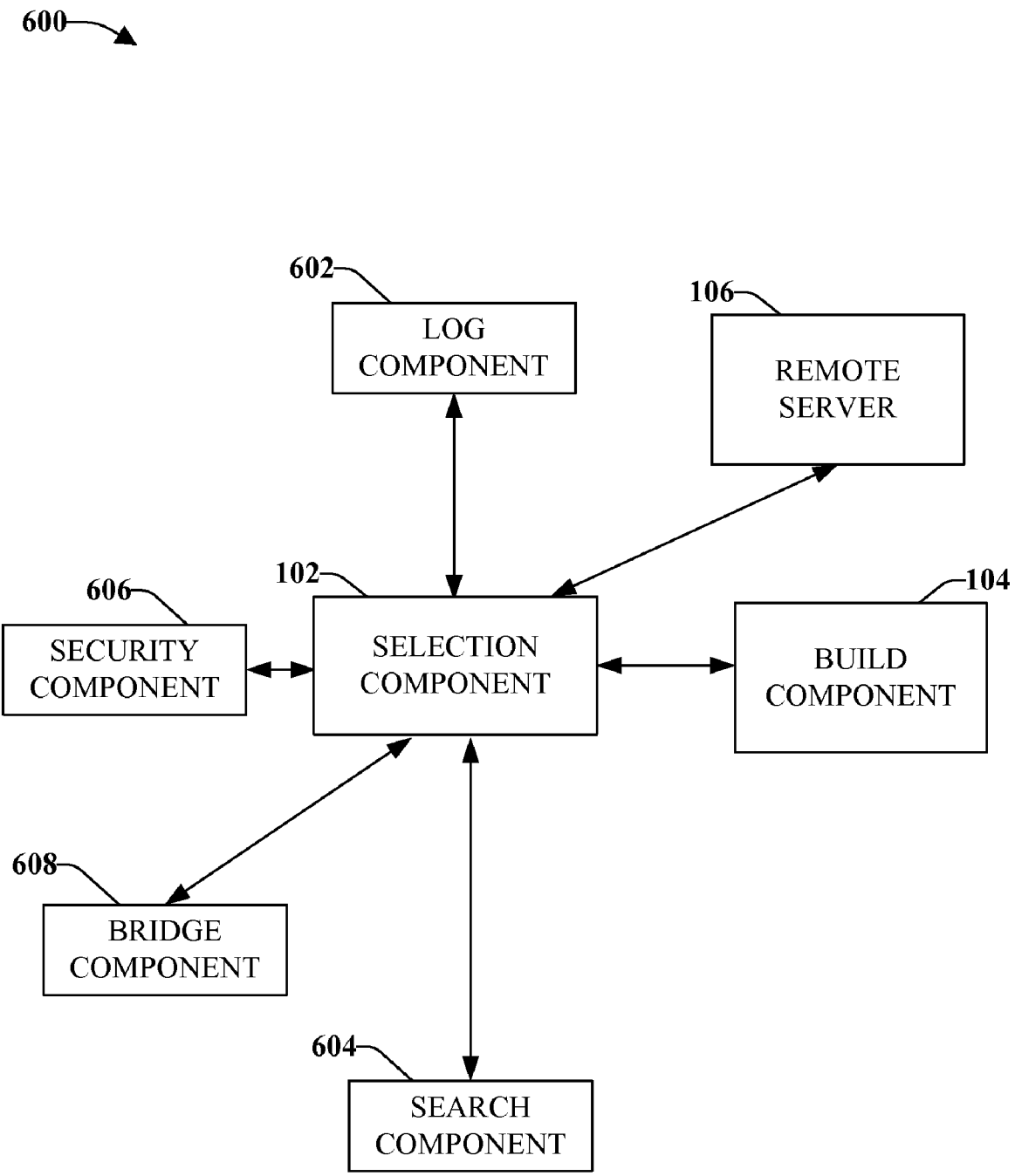
FIG. 6 illustrates a block diagram of an exemplary system that facilitates identifying and constructing industrial-specific data for an industrial environment.

FIG. 6 illustrates a system 600 that facilitates identifying and constructing industrial-specific data for an industrial environment. The system 600 can utilize a log component 602 that tracks data in accordance with the claimed subject matter. In particular, the log component 602 can track and/or monitor data related to data utilized from a remote server, construction of customized data, details related to remote server access, origin of construction of customized data, etc. It is to be appreciated that the log component 602 can be a stand-alone component, incorporated into the selection component 102 and/or any combination thereof. For example, if a user identifies a portion of data to employ in a customized manner within an industrial environment, the log component 602 can track the user (e.g., via IP address, network address, user name, computer name, etc.), the date and time of identification of data, the date and time employment of customized employment, details identified data/customization, the reasoning for the customization, etc. Moreover, the log component 602 can store the logged entries in a data store (not shown).

The selection component 102 can further utilize a search component 604 that facilitates querying any data associated with the system 600. The search component 604 allows a user and/or any component to query the system 600 in relation to portions of applications, portions of services, application data, service-related data, existing data within an environment, historic data related to customizations (e.g., location, time, version, origin, etc.), details related to portions of data utilized to construct applications and/or services, etc. For instance, a user can query the system 600 utilizing the search component 604 to find a portion of customized application (and various details related thereto) associated with a particular controller within the Localville, Ohio plant. In another example, the search component 604 can allow a developer/user/entity (e.g., a computer, a machine, a corporation, a group, an individual, a controller, etc.) to locate all variable names associated with customized code utilized within sector 5, cell 6. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the selection component 102, a stand-alone component, and/or any combination thereof.

The selection component 102 can further utilize a security component 606 that provides security to the system 600 to ensure data integrity and/or access in connection with the selection component 102, the build component 104, the remote server 106, and/or most any suitable combination thereof. In particular, the security component 606 can define security, authorization, and/or privileges in accordance with at least one of a pre-defined hierarchy, security level, user-name, password, access rights, data importance (e.g., more important data correlates with high security clearance), etc. For instance, a portion of data related to the remote server can be a first security level with distinct security authorizations and/or privileges, while a disparate portion of data related to the remote server can have a second security level with disparate security authorizations and/or privileges. Thus, the security component 606 can provide granular security and/or privileges in relation to the system 600. It is to be appreciated that there can be various levels of security with numerous characteristics associated with each level and that the subject innovation is not limited to the above example. It is to be appreciated that security component 606 can be a stand-alone component, incorporated into the selection component 102, and/or most any suitable combination thereof.

The selection component 102 can further include a bridge component 608 that facilitates networking within an industrial automation environment. In other words, the bridge component 608 can act as a network bridge. It is to be appreciated that the bridge component 608 can be a stand-alone component, incorporated into the selection component 102, and/or any combination thereof. Thus, data carried by disparate networks can be manipulated so that it conforms to a common network. Accordingly, the bridge component 608 can recognize a network protocol associated with received instructions related to the selection component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP). It is to be appreciated that the first network protocol and the second protocol can be both CIP or one be Hart and one be ASI-Bus.

Figure 7:
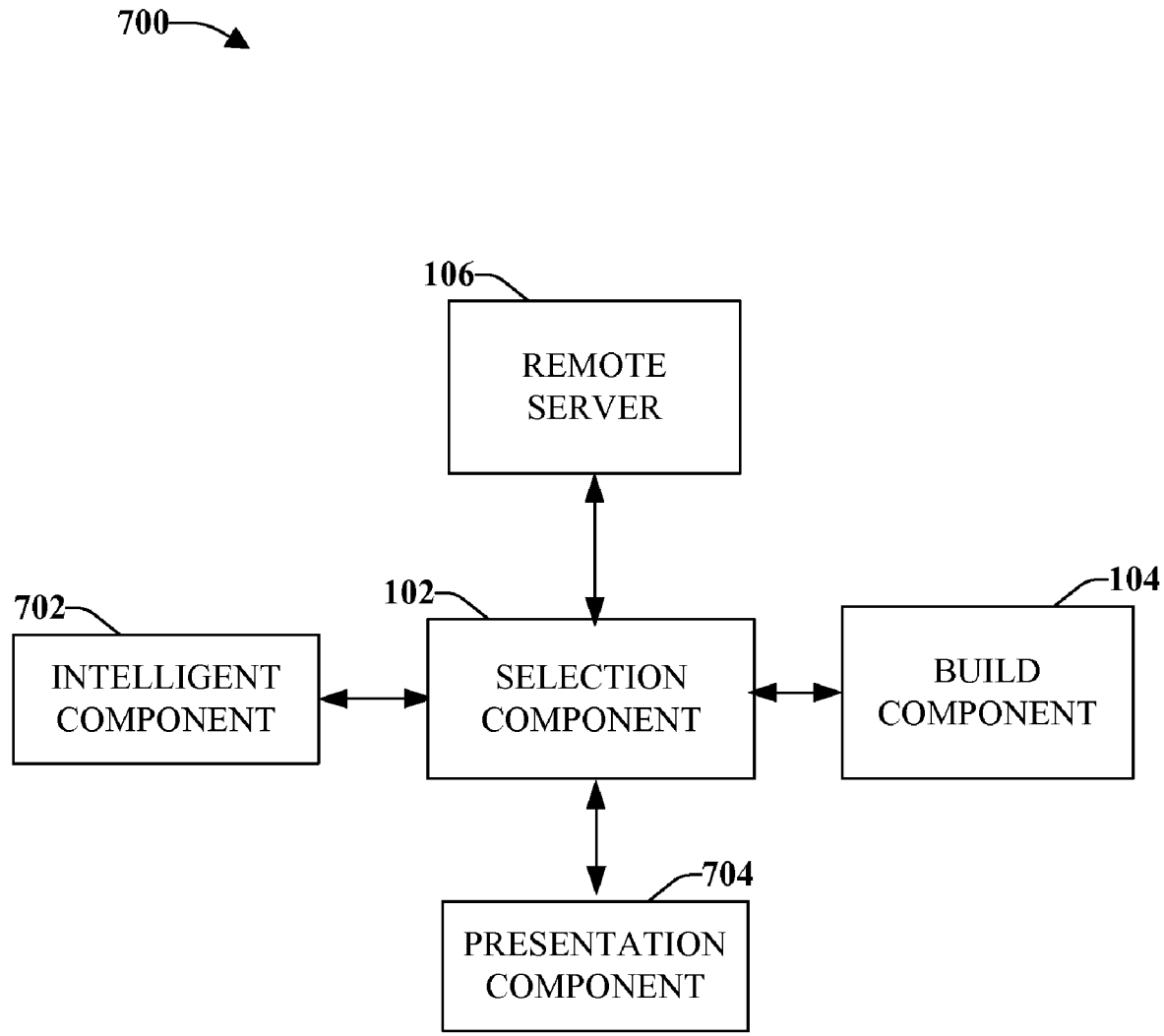
FIG. 7 illustrates a block diagram of an exemplary system that facilitates identifying portions of data that can be utilized to create customized data.

FIG. 7 illustrates a system 700 that employs intelligence to facilitate identifying portions of data that can be utilized to create customized data. The system 700 can include the selection component 102, the build component 104, and the remote server 106 that can all be substantially similar to respective components and servers described in previous figures. The system 700 further includes an intelligent component 702. The intelligent component 702 can be utilized by the selection component 102 to facilitate creating customized applications and/or services for an industrial environment. For example, the intelligent component 702 can infer portions of data to be identified by the selection component 102, build settings, assembly configurations, installation and/or deployment settings, target source for data deployment, remote server preferences and/or settings, services desired, applications desired, recommended data and/or services for the industrial environment, settings related to a particular service implemented, settings related to a portion of data to be employed within an industrial environment, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, intelligent agents, and probabilistic classification models providing different patterns of independence can be employed. Classification as used herein also is inclusive of statistical regression that is utilized to develop models of priority.

A presentation component 704 can provide various types of user interfaces to facilitate interaction between a user and any component coupled to at least one of the selection component 102, the build component 104, or the remote server 106. As depicted, the presentation component 704 is a separate entity that can be utilized with selection component 102. However, it is to be appreciated that the presentation component 704 and/or similar view components can be incorporated into the selection component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the selection component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retina scan, iris scan, facial patters, hand measurement, etc.), and the like. Moreover, the presentation component 704 can present data to a non-human interfaces such as other machines.

Figure 8:
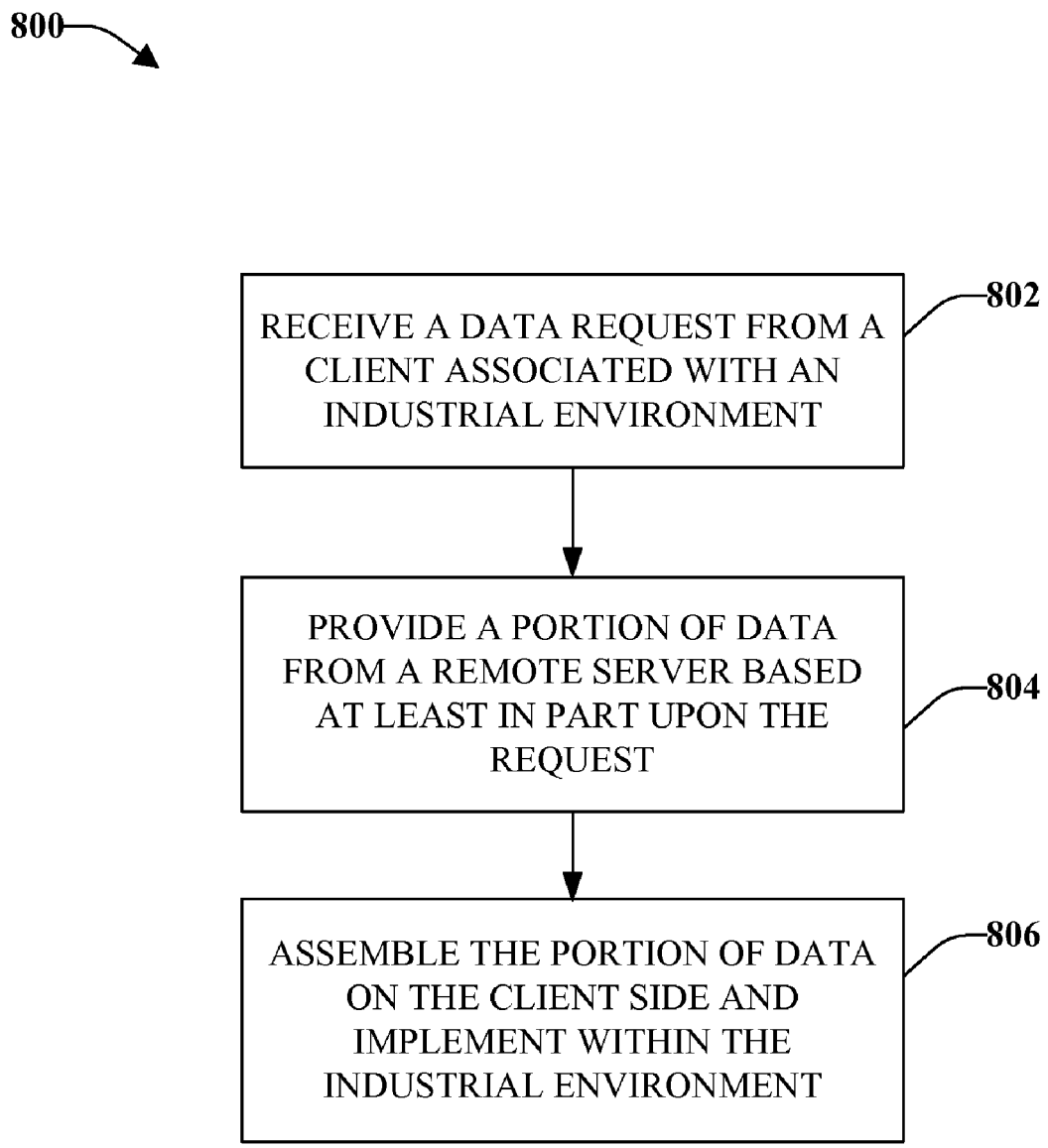
FIG. 8 illustrates an exemplary methodology for deploying a portion of an application or a portion of a service in a customized manner within an industrial environment.
Figure 9:
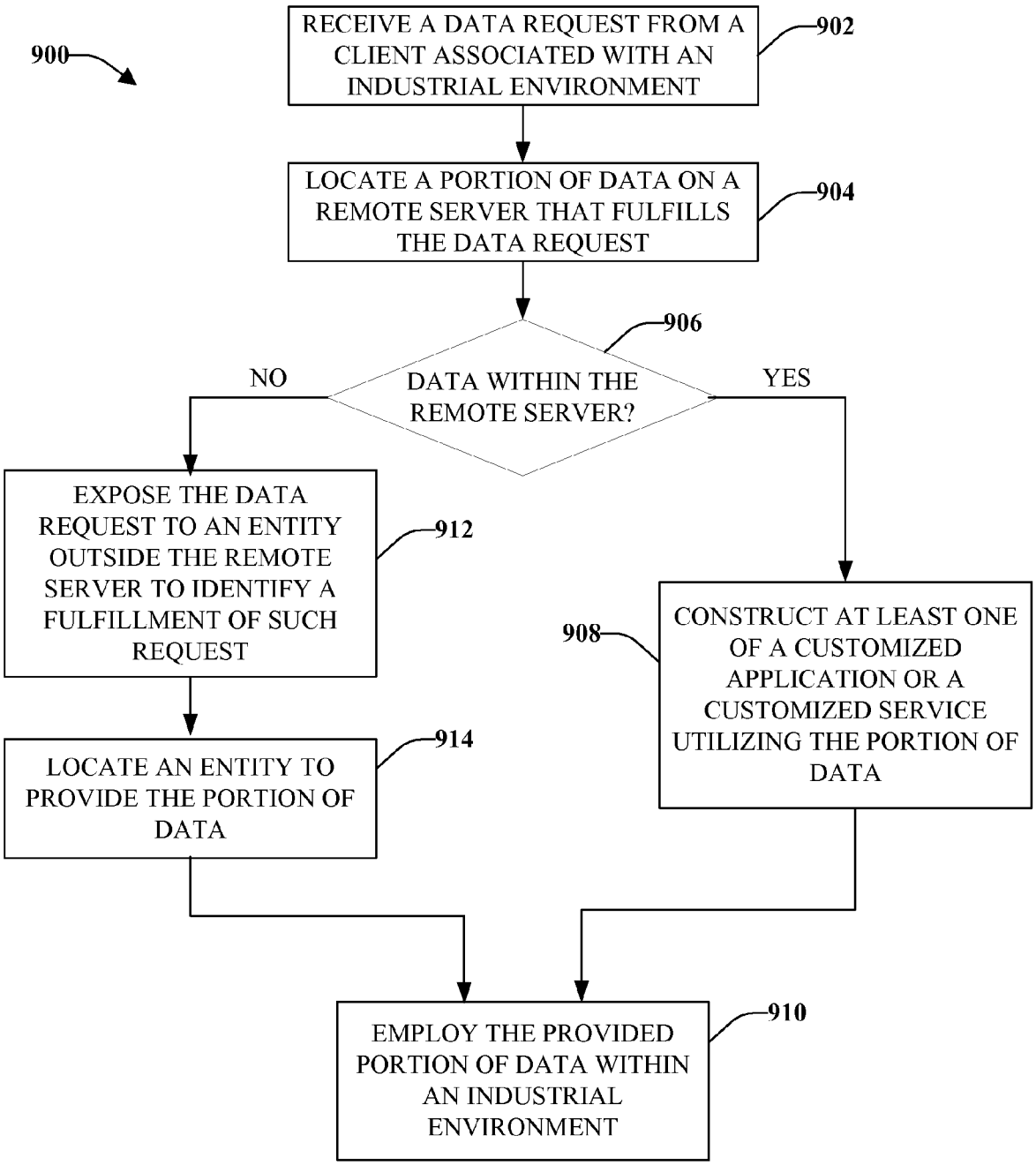
FIG. 9 illustrates an exemplary methodology that facilitates identifying a resource that can generate a portion of customized data for deployment within an industrial environment.

Referring to FIGS. 8-9, methodologies in accordance with various aspects of the claimed subject matter are illustrated.

While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for deploying a portion of an application or a portion of a service in a customized manner within an industrial environment. At reference numeral 802, a data request from a client associated with an industrial environment can be received. It is to be appreciated that the data request can be received from most any suitable client such as, but not limited to, a user, a machine, a component, a client, a group, a facility, an enterprise, a business, a collection of machines, a collection of users, a programmer, an industrial environment, a network, a disparate server, a website, an email application, an application, a mobile device (e.g., a laptop, a portable digital assistant (PDA), a tablet PC, a handheld, etc.), a mobile communication device (e.g., a smart phone, a cellular phone, etc.), and/or most any suitable entity, user, or machine that can select portions of data remotely. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy.

At reference numeral 804, the portion of data can be provided from a remote server based at least in part upon the data request. The remote server can be a host for portions of data (e.g., portions of applications, portions of services, portions of data/code, etc.) that can fulfill a data request received from a client within an industrial environment. The remote server can be a host to a myriad of data, applications, software, processes, functional blocks, services, upgrades, tools, etc. In other words, the remote server can be a remote palette of applications, data, tools, services, functional blocks, processes, software, etc. that can fulfill a data request received from a client. For instance, the remote server can be a user, an entity (e.g., a group, a facility, an enterprise, a business, a factory, a collection of machines, a collection of computers, a collection of users, a programmer, most any combination thereof, etc.), a machine, a computer, a disparate industrial environment, a third-party, a vendor, the Internet, a network, a service, a disparate network not affiliated with the industrial environment, and/or most any suitable component or user that can provide a portion of data that can be utilized within the industrial environment. At reference numeral 806, the portion of data can be assembled on the client side and implemented within the industrial environment. Thus, a client can send a data request that can be fulfilled by a remote server, wherein the portion of data from the remote server can be assembled to be utilized within the industrial environment providing a customized application and/or service. It is to be appreciated that the portion of data received from the remote server can be assembled to create at least one of a customized application or a customized service alone, in combination with disparate portions of data hosted by the remote server, with disparate data created/hosted by the industrial environment, and/or most any suitable combination thereof.

FIG. 9 illustrates a methodology 900 that facilitates identifying a resource that can generate a portion of customized data for deployment within an industrial environment. At reference numeral 902, a data request from a client associated with an industrial environment can be received. The data request can be associated with a customized application and/or customized service that is desired by the client for the industrial environment. For example, the services/applications can relate to partitioned applications (e.g., functional blocks and/or control blocks to combine and execute a process, portions of data based on operation, portions of data related to applications, portions of data related to code and/or programming languages, etc.), connectivity within an industrial environment, testing (e.g., emulation of controller and/or controller engine instance, application and/or process simulation, etc.), pre-tests for a controller and/or a controller engine instance, customized controllers and/or engines, diagnostics for an industrial environment, safety/security related to an industrial environment, dynamic updates related to an industrial environment, load balancing, monitoring, data back-up, business analysis, most any suitable service and/or application that can be provided to an industrial environment, etc.

At reference numeral 904, a portion of data that fulfills the data request can be located on a remote server. For example, a client can provide a data request that relates to a customized service that initiates multiple controller engine instances within an industrial environment, wherein the service (e.g., portion of data) can be identified and/or located within the remote server (e.g., third-party). Yet, in some instances, there may be the situation that a portion of data may not exist on the remote server. At reference numeral 906, a determination whether the portion of data is within the remote server. If the data is within the remote server, the methodology 900 can continue at reference numeral 908. At reference numeral 908, at least one of a customized application or a customized service can be constructed utilizing the portion of data within the remote server. For instance, the portion of data can be received on the client side and assembled and/or constructed with most any suitable data (e.g., disparate data within the remote server, disparate data within the industrial environment, disparate data not associated with the remote server or industrial environment, created data, etc.) to build an industrial-specific application and/or service. At reference numeral 910, the provided portion of data associated with the customized application/service can be employed within the industrial environment.

If the data is not located within the remote server, the methodology 900 can continue at reference numeral 912. At reference numeral 912, the data request can be exposed to an entity (e.g., user, group, company, machine, programmer, vendor, independent contractor, third-party, etc.) outside the remote server to identify a fulfillment of such data request. For instance, the data request can be communicated to various entities to respond whether completion of such task/request can be made. It is to be appreciated that the request can be posted on a website, the Internet, a blog message board, users via communications (e.g., email, text message, voice over Internet Protocol (VOIP), etc.), companies, a forum capable of locating third-parties that can complete the requested task, a network dedicated to entities that can perform data requests related to industrial environments, programmers, groups of companies, enterprises, managers, most any suitable third-party that can fulfill such request, etc. At reference numeral 914, an entity that can provide the portion of data to fulfill the data request can be located. It is to be appreciated that the entity can be further identified by utilizing an auction in relation to providing such service/application that fulfills the data request. Furthermore, upon identification of an entity that can fulfill the data request, the remote server can be updated to include such information for future data requests. The methodology 900 can proceed to reference numeral 910 where the provided portion of data can be employed within the industrial environment.

Figure 10:
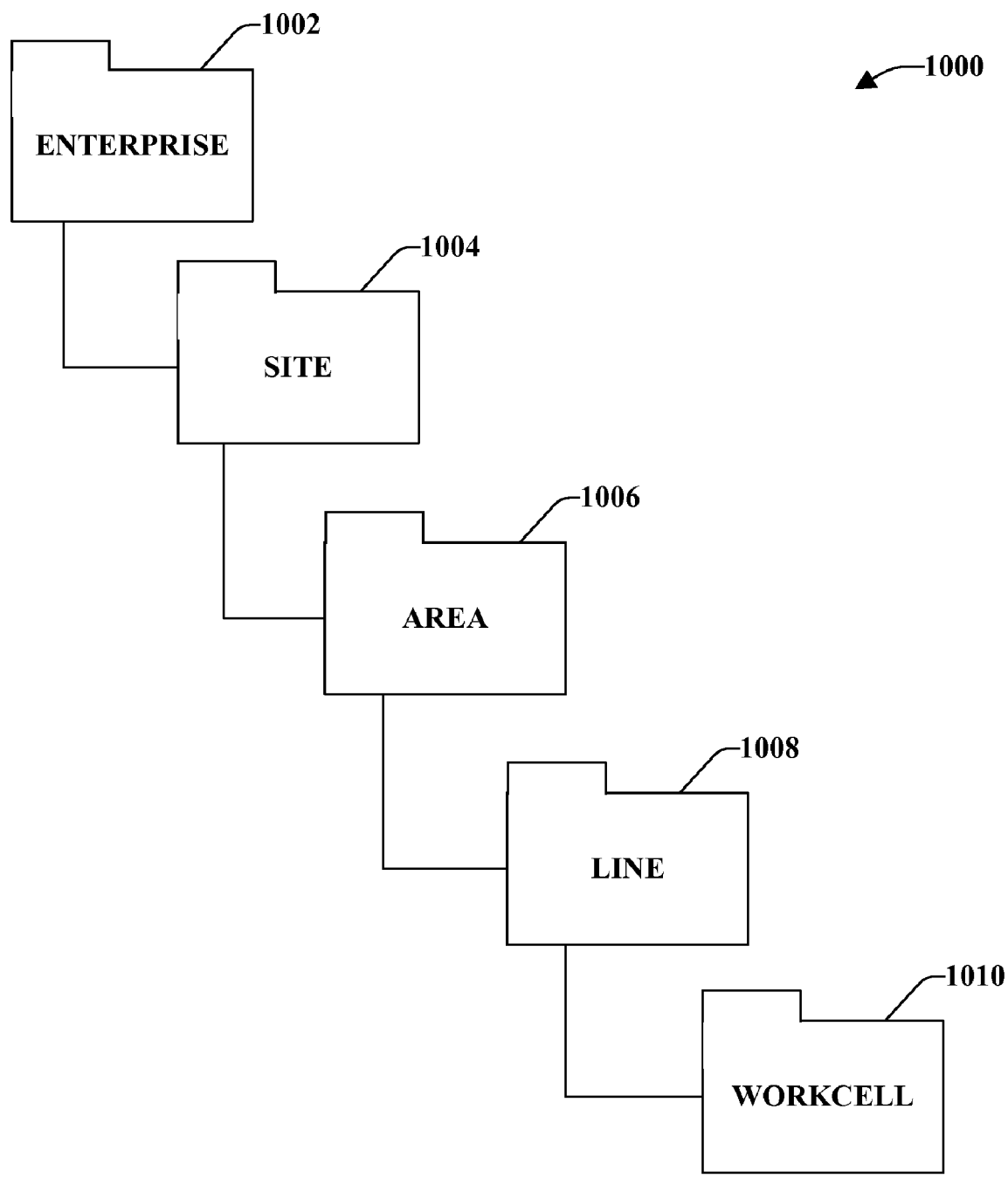
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of devices, processes, etc.) alluded to herein is illustrated. For example, the data model can facilitate utilizing nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith. It is to be appreciated that the structure 1000 is for exemplary purposes only and a plurality of levels can be implemented with a multitude of entities can be employed.

Figure 11:
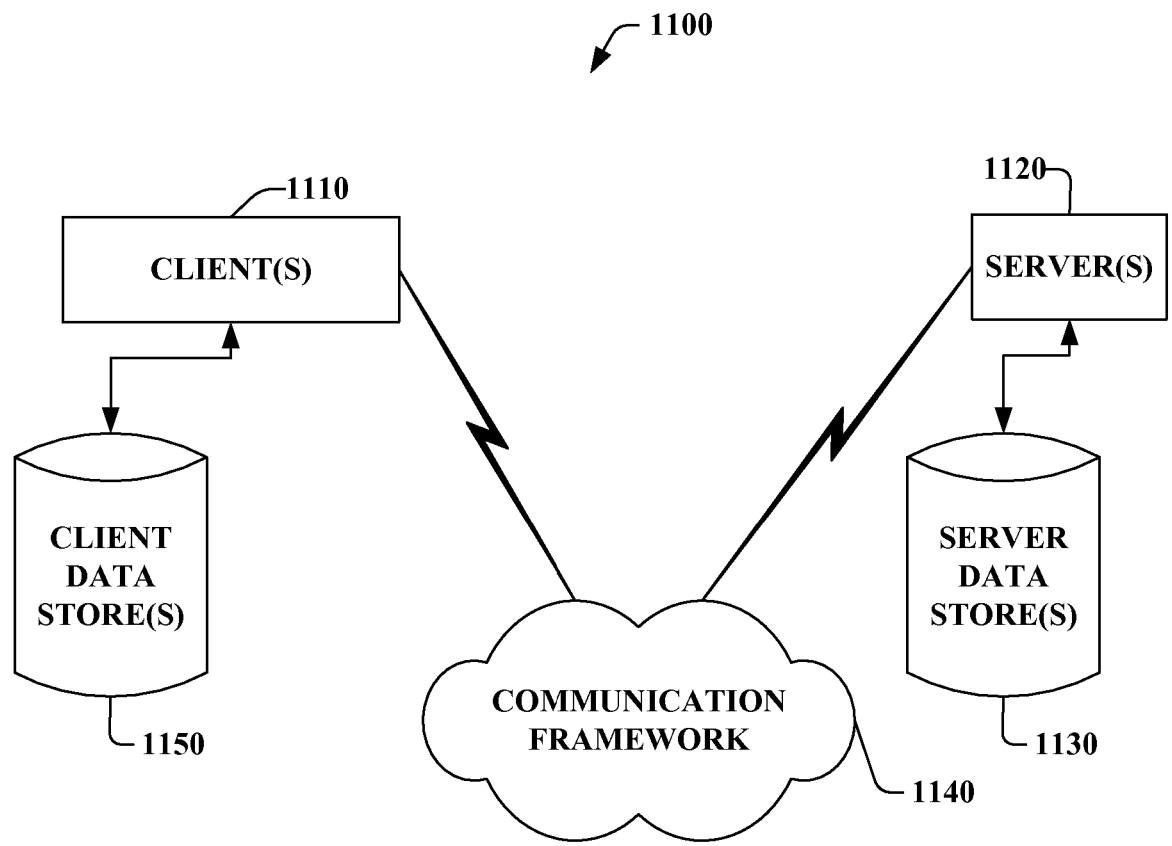
FIG. 11 is an exemplary computing environment that can be utilized in connection with the claimed subject matter.
Figure 12:
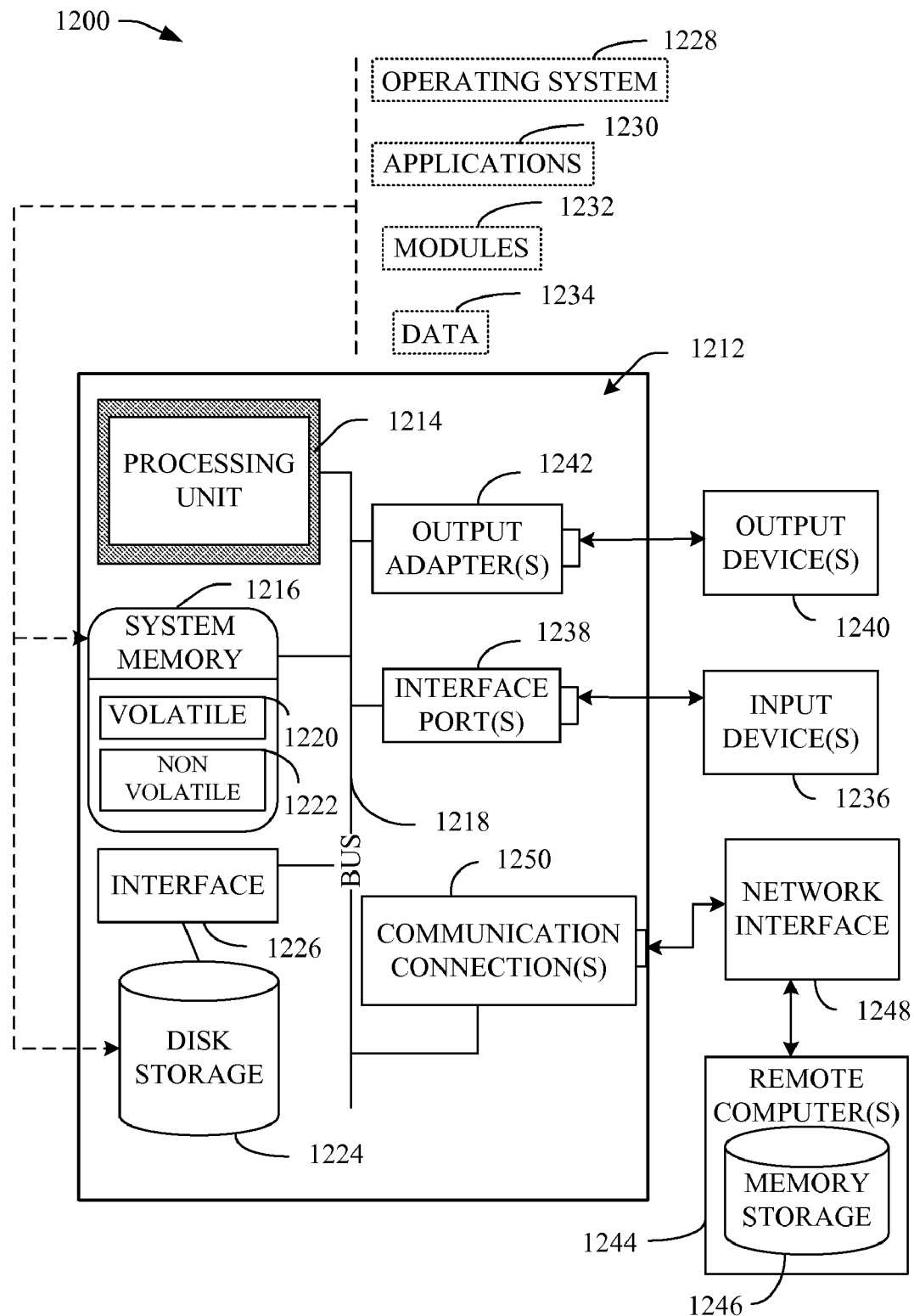
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchronous-link DRAM (SLDRAM), Rambus direct RAM (RDRAM), direct Rambus dynamic RAM (DRDRAM), MRAM, and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing at least one of a service or data to an industrial environment, comprising:
   at least two controllers associated with the industrial environment, comprising:
      a processor that generates at least two controller engine instances and executes the at least two controller engine instances, wherein the at least two controller engine instances control at least two industrial devices or industrial processes; and
      a memory that stores the at least two controller engine instances, wherein
      at least one of the at least two controller engine instances is shared between the at least two controllers;

a selection component that identifies a portion of data hosted by a remote server based at least in part on a data request related to at least one of the at least two controller engine instances; and a build component that constructs at least one of a portion of a customized application or a portion of a customized service based at least in part upon the portion of data, at least one of the portion of the customized application or the portion of the customized service is related to at least one of the at least two controller engine instances.

2. The system of claim 1, the build component constructs at least one of the portion of the customized application or the portion of the customized service with at least one of a disparate portion of data hosted by the remote server, a disparate portion of data hosted by the industrial environment, or data created in order to annotate the portion of the customized application or the portion of the customized service.

3. The system of claim 1, the remote server is a remotely accessible palette of at least one of a portion of applications, a portion of services, a portion of data, a tool, a functional block, a portion of processes, or a portion of software.

4. The system of claim 1, at least one of the portion of the customized application or the portion of the customized service is at least one of an emulation of at least one of the at least two controller engine instances, a pre-test for at least one of the at least two controller engine instances, a customized at least one of the at least two controller engine instances, or a load balancing service for at least one of the at least two controller engine instances.

5. The system of claim 1, the portion of the data is at least one of a portion of a partitioned application, a portion of functional blocks, a portion of control blocks, portions of data related to applications, portions of data related to code, or portions of data related to a programming language.

6. The system of claim 1, at least one of the portion of the customized application or the portion of the customized service enables at least one of an isolation of an industrial environment, a prioritization of the industrial environment, a scalability within the industrial environment, an on-line editing, a versioning update, a security within an industrial environment, a load balancing for the industrial environment, a redundancy utilizing multiple controller engine instances within the industrial environment, or a safety related to the industrial environment.

7. The system of claim 1, further comprising a balance component generated by the build component based upon the portion of data.

8. The system of claim 1, further comprising a locate component that identifies a part of the portion of data that is not located on the remote server and finds the part of the portion of data within at least one of a plurality of entities.

9. The system of claim 1, the selection component further comprising a security component that defines at least one of a security level, an authorization, or a privilege that corresponds to at least one of the portion of the customized application or the portion of the customized service.

10. The system of claim 1, the selection component further comprising a search component that facilitates querying the remote server for the portion of data.

11. The system of claim 1, further comprising a log component that tracks data related to at least one of the portion of the customized application, or the portion of the customized service.

12. The system of claim 1, the selection component further comprising a bridge component that is a network bridge between two or more communication networks.

13. The system of claim 1, wherein the at least one controller generates at least one of the at least two controller engine instances.

14. The system of claim 1, wherein at least one of the at least two controller engine instances executes on the at least one controller with a real time operating system.

15. The system of claim 1, wherein at least one of the at least two controller engine instances is a distributed controller engine instance, wherein at least two controllers host the distributed controller engine instance.

16. The system of claim 1, wherein at least one of the at least two controller engine instances is hosted on a first controller and handed off to a second controller upon occurrence of at least one event.

17. A method that facilitates remotely serving an industrial environment, comprising:
receiving a data request related to two or more controller engine instances generated by at least two controllers in an industrial environment, wherein the two or more controller engine instances control two or more industrial devices or industrial processes;
sharing at least one of the at least two controller engine instances between the at least two controllers;
providing a portion of data from a remote server based at least in part upon the data request; and
assembling the portion of data to construct a customized service related to the two or more controller engine instances.

18. The method of claim 17, further comprising:
exposing the data request to an entity outside the remote server.

19. The method of claim 17, wherein the receiving the data request comprises receiving a selection of at least one of services or applications associated with implementing the two or more controller engine instances.

20. The method of claim 19, wherein the assembling the portion of data further comprises assembling the at least one of services or applications associated with implementing the two or more controller engine instances.

21. A method for providing a portion of service to an industrial environment, comprising:
identifying a portion of data hosted by a remote server according to a data request related to two or more controller engine instances generated by at least two controllers, wherein the two or more controller engine instances control two or more industrial devices or industrial processes;
sharing at least one of the two or more controller engine instances between the at least two controllers; and
constructing at least one of a portion of a customized application or a portion of a customized service based at least in part upon the portion of data.

22. The method of claim 21, further comprising utilizing the at least one of the portion of the customized application or the portion of the customized service in connection with the two or more controller engine instances.

23. The method of claim 21, wherein the identifying the portion of data further comprises identifying the portion of data hosted by the remote server according to a selection of at least one of services or applications associated with implementing the two or more controller engine instances.

24. The method of claim 23, wherein the constructing further comprises assembling the at least one of services or applications associated with implementing the two or more controller engine instances.

* * * * *